(12) United States Patent
Fukunaga

(10) Patent No.: US 12,191,541 B2
(45) Date of Patent: Jan. 7, 2025

(54) METHOD FOR DIAGNOSING FAILURE IN PRESSURE GAUGE OF HYDROGEN FILLING SYSTEM AND METHOD FOR CALIBRATING PRESSURE GAUGE OF HYDROGEN FILLING SYSTEM

(71) Applicant: ENEOS Corporation, Tokyo (JP)

(72) Inventor: Akihiko Fukunaga, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 1017 days.

(21) Appl. No.: 17/019,992

(22) Filed: Sep. 14, 2020

(65) Prior Publication Data

US 2020/0411886 A1   Dec. 31, 2020

Related U.S. Application Data

(63) Continuation of application No. PCT/JP2019/008743, filed on Mar. 6, 2019.

(30) Foreign Application Priority Data

Mar. 26, 2018   (JP) ................. 2018-058795

(51) Int. Cl.
*F17C 5/06* (2006.01)
*F17C 13/02* (2006.01)
(Continued)

(52) U.S. Cl.
CPC .......... *H01M 8/04425* (2013.01); *F17C 5/06* (2013.01); *F17C 13/025* (2013.01);
(Continued)

(58) Field of Classification Search
CPC .... F17C 5/06; F17C 13/025; F17C 2221/012; F17C 2223/0123; F17C 2223/036;
(Continued)

(56) References Cited

U.S. PATENT DOCUMENTS

2005/0247123 A1   11/2005 Fuse
2009/0283351 A1   11/2009 Cannet et al.
(Continued)

FOREIGN PATENT DOCUMENTS

CN   101006303   7/2007
CN   104169118   10/2016
(Continued)

OTHER PUBLICATIONS

JP2017075635A—translate (Year: 2017).*
(Continued)

*Primary Examiner* — Kristina M Deherrera
*Assistant Examiner* — Fatemeh Esfandiari Nia
(74) *Attorney, Agent, or Firm* — GREENBLUM & BERNSTEIN, P.L.C.

(57) ABSTRACT

According to one aspect of the present invention, a method for diagnosing failure in a pressure gauge of a hydrogen filling system includes filling a fuel cell vehicle powered by hydrogen fuel with the hydrogen fuel from an accumulator, in which the hydrogen fuel is accumulated, via a dispenser; and acquiring pressure values measured by a plurality of pressure gauges disposed at different positions in a flow passage of the hydrogen fuel between the accumulator and an outlet of the dispenser at timing when a flow rate of the hydrogen fuel to be filled at a stage close to an end of the filling becomes a threshold value or less, determining whether or not a deviation between the pressure values is within a threshold value on the basis of acquired pressure values, and outputting a determination result.

6 Claims, 8 Drawing Sheets

(51) Int. Cl.
  *H01M 8/04082* (2016.01)
  *H01M 8/0438* (2016.01)
  *H01M 8/04746* (2016.01)

(52) U.S. Cl.
  CPC ... *H01M 8/04201* (2013.01); *H01M 8/04753* (2013.01); *F17C 2221/012* (2013.01); *F17C 2223/0123* (2013.01); *F17C 2223/036* (2013.01); *F17C 2250/043* (2013.01); *F17C 2265/065* (2013.01); *F17C 2270/0178* (2013.01); *H01M 2250/20* (2013.01)

(58) Field of Classification Search
  CPC .......... F17C 2250/043; F17C 2265/065; F17C 2270/0178; H01M 8/04201
  See application file for complete search history.

(56) References Cited

U.S. PATENT DOCUMENTS

| | | |
|---|---|---|
| 2015/0032326 A1 | 1/2015 | Fushiki et al. |
| 2016/0141684 A1 | 5/2016 | Yamanaka et al. |

FOREIGN PATENT DOCUMENTS

| | | | |
|---|---|---|---|
| CN | 105609812 | 1/2018 | |
| DE | 19860500 A1 * | 7/2000 | ............. G01L 15/00 |
| DE | 10 2009 059 137 | 7/2010 | |
| JP | 10-169896 | 6/1998 | |
| JP | 2011-122657 | 6/2011 | |
| JP | 2013-200019 | 10/2013 | |
| JP | 2015-21573 | 2/2015 | |
| JP | 2015-21573 A | 2/2015 | |
| JP | 2015-197700 A | 11/2015 | |
| JP | 2017-75635 A | 4/2017 | |
| JP | 2017-207094 | 11/2017 | |

OTHER PUBLICATIONS

DE-19860500-A1—translate (Year: 2000).*
Chinese Office Action issued in CN Application No. 201980022405.6, dated Jul. 6, 2019, along with machine English translation thereof.
International Search Report issued in International Patent Application No. PCT/JP2019/008743, dated May 28, 2019, along with an English translation thereof.
Written Opinion issued in International Patent Application No. PCT/JP2019/008743, dated May 28, 2019, along with an English translation thereof.
Extended European Search Report issued in EP Application No. 19776713.0, dated Dec. 3, 2021.
Australian Examination Report received in Application No. 2019246446, dated Oct. 20, 2021.
Australia, Examination report received in Application No. 2022259860, dated May 9, 2024.
European Office Action, Communication pursuant to Article 94 (3) EPC issued in EP Application No. 19 776 713.0, dated Feb. 26, 2024.

* cited by examiner

Pressure (MPa)

| Each Pressure Value \ Date | 2018/1/1 | 2017/12/1 | 2017/11/1 | 2017/10/1 |
|---|---|---|---|---|
| A1 | 82.2 | 82.2 | 82.1 | - |
| A2 | - | - | - | 82.2 |
| A3 | - | - | - | - |
| B | 75.1 | 80.5 | 80.5 | 80.6 |
| C1 | 79.8 | 79.9 | 79.8 | 79.8 |
| C2 | - | - | - | - |
| D | - | - | - | - |

Pressure (MPa)

| Each Pressure Value \ Date | 2018/1/20 | |
|---|---|---|
| A1 | - | |
| A2 | - | |
| A3 | 79.1 | |
| B | 79.0 | ... |
| C1 | 71.0 | |
| C2 | 78.2 | |
| D | 78.1 | |

NG (applies to the table)

FIG.6

METHOD FOR DIAGNOSING FAILURE IN PRESSURE GAUGE OF HYDROGEN FILLING SYSTEM AND METHOD FOR CALIBRATING PRESSURE GAUGE OF HYDROGEN FILLING SYSTEM

CROSS-REFERENCE TO RELATED APPLICATION

This application is a continuation application based upon and claims the benefit of priority from prior Japanese Patent Application No. 2018-058795 (application number) filed on Mar. 26, 2018 in Japan, and International Application PCT/JP2019/008743, the International Filing Date of which is Mar. 6, 2019. The contents described in JP2018-058795 and PCT/JP2019/008743 are incorporated in the present application.

BACKGROUND OF THE INVENTION

Field of the Invention

The present invention relates to a method for diagnosing a failure in a pressure gauge of a hydrogen filling system and a method for calibrating a pressure gauge of a hydrogen filling system, for example, a method for diagnosing failures of a plurality of pressure gauges disposed in a flow passage of hydrogen fuel from an accumulator to a dispenser.

Description of Related Art

As fuel for vehicles, in addition to conventional fuel oils such as gasoline, recently, hydrogen fuel has attracted attention as a clean energy source. As a result, fuel cell vehicles (FCVs) powered by the hydrogen fuel have been developed. In order to popularize the fuel cell vehicle (FCV), it is necessary to expand hydrogen stations capable of rapidly filling the fuel cell vehicle with the hydrogen fuel. At the hydrogen station, in order to rapidly fill the FCV vehicle with the hydrogen fuel (hydrogen gas), a multi-stage accumulator including a plurality of accumulators for accumulating the hydrogen fuel compressed to a high pressure by a compressor is disposed. By performing filling via a dispenser (measuring device) while switching the accumulator to be used, a pressure difference between a pressure inside the accumulator and a pressure of a fuel tank of the FCV vehicle is greatly maintained, and the FCV vehicle is rapidly filled with the hydrogen fuel by the pressure difference from the accumulator to the fuel tank (see JP-A-2015-197700, for example).

Here, a plurality of pressure gauges are disposed in the middle of the flow passage for supplying the hydrogen fuel from the multi-stage accumulator disposed at the hydrogen station to the FCV vehicle via the dispenser. The plurality of pressure gauges are required by law to have a calibration inspection every two years. The pressure gauge of the hydrogen station is generally calibrated at a factory by removing it. However, there is a problem that it is not possible to grasp failures occurring within a two-year period until a next legal inspection, after the calibration. If the pressure gauge is removed and a calibration inspection is performed at the factory, separately from the legal inspection, within the period until the next legal inspection, this requires cost and time. Further, during the inspection, an operation of a filling system of the hydrogen station is stopped. For this reason, a method capable of confirming accuracy at low cost during a normal operation is demanded.

Here, a method for diagnosing a failure of the pressure gauge in the dispenser according to whether or not a pressure of the side of an inlet in the dispenser is equal to a pressure of a precooler outlet in the dispenser, by opening a shut-off valve in the dispenser in a state in which a filling port coupling at a tip of a nozzle of the dispenser is not connected to the fuel tank of the FCV vehicle, that is, a value incorporated in the filling port coupling is closed is disclosed (see JP-A-2015-021573, for example). However, in the above method, in addition to a filling operation to the FCV vehicle, a valve operation is required for checking, and it is difficult to confirm the pressure gauge on the upstream side of the dispenser.

BRIEF SUMMARY OF THE INVENTION

According to one aspect of the present invention, a method for diagnosing failure in a pressure gauge of a hydrogen filling system includes
  filling a fuel cell vehicle powered by hydrogen fuel with the hydrogen fuel from an accumulator, in which the hydrogen fuel is accumulated, via a dispenser; and
  acquiring pressure values measured by a plurality of pressure gauges disposed at different positions in a flow passage of the hydrogen fuel between the accumulator and an outlet of the dispenser at timing when a flow rate of the hydrogen fuel to be filled at a stage close to an end of the filling becomes a threshold value or less, determining whether or not a deviation between the pressure values is within a threshold value on the basis of acquired pressure values, and outputting a determination result.

According to another aspect of the present invention, a method for diagnosing failure in a pressure gauge of a hydrogen filling system, the method includes
  filling a fuel cell vehicle powered by hydrogen fuel with the hydrogen fuel from an accumulator, in which the hydrogen fuel is accumulated, via a dispenser; and
  at timing when a pressure gauge closest to an outlet of the dispenser in a plurality of pressure gauges disposed at different positions in a flow passage of the hydrogen fuel between the accumulator and the outlet of the dispenser indicates a highest value during the filling of the hydrogen fuel, acquiring pressure values measured by the plurality of pressure gauges, determining whether or not a deviation between the pressure values is within a threshold value on the basis of acquired pressure values, and outputting a determination result.

According to further another aspect of the present invention, a method for diagnosing failure in a pressure gauge of a hydrogen filling system includes
  sequentially filling a plurality of fuel cell vehicles powered by hydrogen fuel with the hydrogen fuel on different dates from an accumulator, in which the hydrogen fuel is accumulated, via a dispenser;
  acquiring pressure values measured by a plurality of pressure gauges disposed at different positions in a flow passage of the hydrogen fuel between the accumulator and just before a shut-off valve of the dispenser at timing when the shut-off valve of the dispenser is closed after a flow passage of the hydrogen fuel between the accumulator and the fuel cell vehicle filled with the hydrogen fuel is temporarily opened before starting the filling of the hydrogen fuel, for each time each of the plurality of fuel cell vehicles is filled with the hydrogen fuel, and recording the pressure values in association with dates; and determining whether or not a pressure change in transition of each pressure value recorded on a different date is within a threshold value, for each of the plurality of pressure gauges, and outputting a determination result.

According to further another aspect of the present invention, a method for calibrating a pressure gauge of a hydrogen filling system includes performing the filling, and the determining and the outputting in the method for diagnosing failure in the pressure gauge of the hydrogen filling system described above, the plurality of pressure gauges including two pressure gauges disposed in parallel near the outlet of the dispenser; and automatically calibrating a pressure gauge diagnosed as a failure in the plurality of pressure gauges as the determination result, on the basis of one of the two pressure gauges.

According to further another aspect of the present invention, a method for calibrating a pressure gauge of a hydrogen filling system includes filling a fuel cell vehicle powered by hydrogen fuel with the hydrogen fuel from an accumulator, in which the hydrogen fuel is accumulated, via a dispenser;

at timing when a shut-off valve of the dispenser is closed and shut off after the filling ends and a flow passage on a side of an outlet of the dispenser is opened to an atmosphere, determining whether or not a pressure gauge in a depressurization portion of the dispenser in a plurality of pressure gauges disposed at different positions in a flow passage of the hydrogen fuel between the accumulator and the outlet of the dispenser indicates a zero gauge pressure; and automatically calibrating the pressure gauge in the depressurization portion of the dispenser, when the pressure gauge does not indicate the zero gauge pressure.

BRIEF DESCRIPTION OF THE DRAWINGS

FIG. 4 is a diagram showing an example of recording data of an initial pressure in the first embodiment.

FIG. 6 is a diagram showing an example of recording data of an end pressure in the first embodiment.

DETAILED DESCRIPTION OF THE INVENTION

Embodiments below describe a method capable of confirming accuracy of a plurality of pressure gauges disposed at least in a flow passage from an accumulator to the inside of a dispenser at low cost by using a normal operation.

First Embodiment

Figure 1:
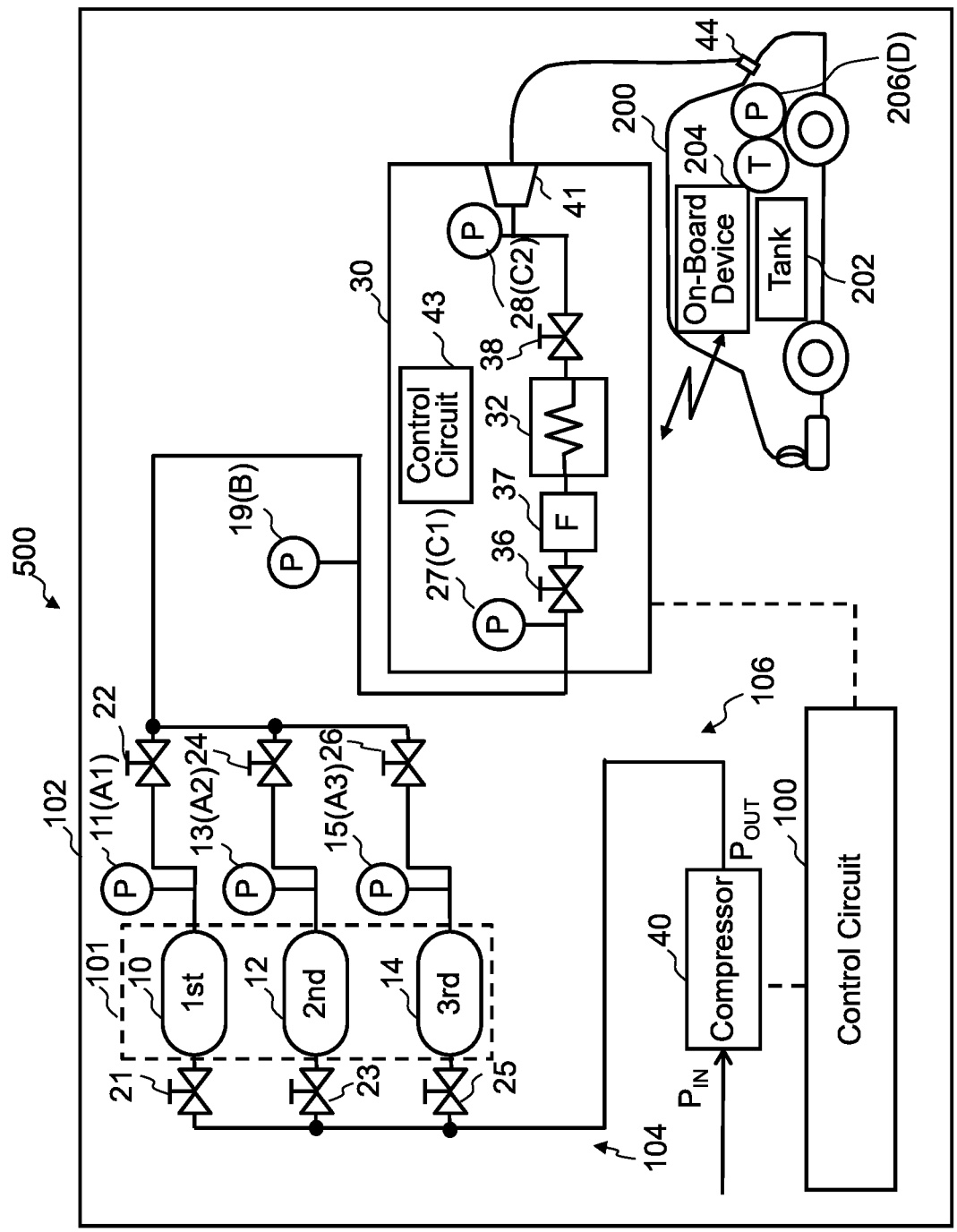
FIG. 1 is an example of a configuration diagram showing a configuration of a hydrogen filling system of a hydrogen station in a first embodiment.

FIG. 1 is an example of a configuration diagram showing a configuration of a hydrogen filling system of a hydrogen station in a first embodiment. In FIG. 1, a hydrogen filling system 500 is disposed in a hydrogen station 102. The hydrogen filling system 500 includes a multi-stage accumulator 101, a dispenser 30, a compressor 40, and a control circuit 100.

The multi-stage accumulator 101 includes a plurality of accumulators 10, 12, and 14 in which a use lower limit pressure is set to multiple levels. In the example of FIG. 1, the three accumulators 10, 12, and 14 configure the multi-stage accumulator 101.

In the example of FIG. 1, for example, the accumulator 10 functions as a 1st bank having a low use lower limit pressure. The accumulator 12 functions as a 2nd bank having an intermediate use lower limit pressure, for example. The accumulator 14 functions as a 3rd bank having a high use lower limit pressure, for example. However, the present invention is not limited thereto. The accumulators used in the 1st bank to the 3rd bank are replaced as needed. In the hydrogen station 102, a curdle, an intermediate accumulator, and/or a hydrogen production apparatus (not shown) are also disposed. Further, a hydrogen trailer (not shown) for filling and delivering hydrogen gas arrives at the inside of the hydrogen station 102.

Further, in FIG. 1, the suction side of the compressor 40 is connected to the curdle, the intermediate accumulator, the filling tank of the hydrogen trailer, or the hydrogen production apparatus described above by a pipe.

The discharge side of the compressor 40 is connected to the accumulator 10 via a valve 21 by a pipe. Similarly, the discharge side of the compressor 40 is connected to the accumulator 12 via a valve 23 by a pipe. Similarly, the discharge side of the compressor 40 is connected to the accumulator 14 via a valve 25 by a pipe.

Further, the accumulator 10 is connected to the dispenser 30 via a valve 22 by a pipe. Further, the accumulator 12 is connected to the dispenser 30 via a valve 24 by a pipe. Further, the accumulator 14 is connected to the dispenser 30 via a valve 26 by a pipe. As such, the dispenser 30 is commonly connected to the accumulators 10, 12, and 14 configuring the multi-stage accumulator 101.

In FIG. 1, a shut-off valve 36, a flowmeter 37, a cooler 32 (precooler), a shut-off valve 38, an emergency detachment coupler 41, and a control circuit 43 are disposed in the dispenser 30. Further, a nozzle 44 extending to the outside of the dispenser 30 is disposed in the dispenser 30. The dispenser 30 sends the hydrogen fuel (hydrogen gas) supplied from the multi-stage accumulator 101 to the cooler 32 via the shut-off valve 36 and the flowmeter 37. At that time, a flow rate of the hydrogen fuel supplied from the multi-stage accumulator 101 per unit time is controlled by a flow rate adjustment valve (not shown), and is measured by the flowmeter 37. Then, the hydrogen fuel is cooled to, for example, −40° C. by the cooler 32. The cooled hydrogen fuel passes through the shut-off valve 38, the emergency detachment coupler 41, and the nozzle 44, and a fuel tank 202 mounted on an FCV vehicle 200 is filled with the hydrogen fuel using a pressure difference. Further, the control circuit 43 is configured to be able to communicate with an on-board device 204 in the FCV vehicle 200 (fuel cell vehicle (FCV) powered by the hydrogen fuel) that has arrived at the hydrogen station 102. For example, the control circuit 43 is configured to be able to perform wireless communication using infrared rays. Further, the control circuit 43 is connected to the control circuit 100 that controls the entire hydrogen filling system 500.

Further, in the hydrogen filling system 500 in FIG. 1, a plurality of pressure gauges are disposed at different positions in a flow passage of the hydrogen fuel between the multi-stage accumulator 101 and an outlet of the dispenser 30. Specifically, a pressure (A1) in the accumulator 10 is measured by a pressure gauge 11. A pressure (A2) in the accumulator 12 is measured by a pressure gauge 13. A pressure (A3) in the accumulator 14 is measured by a pressure gauge 15. A pressure (B) in the middle of a pipe connecting the multi-stage accumulator 101 and the dispenser 30 is measured by a pressure gauge 19. Further, in the dispenser 30, a pressure (C1) near an inlet of the dispenser 30 supplied to the dispenser 30 is measured by a pressure gauge 27. Further, a pressure (C2) near the outlet of the dispenser 30 is measured by a pressure gauge 28. In the example of FIG. 1, the pressure gauge 27 measures a pressure of the upstream side (primary side) of the shut-off valve 36 located on the primary side of the cooler 32. The pressure gauge 28 measures a pressure near the emergency detachment coupler 41 on the secondary side of the cooler 32. Pressure data measured by each pressure gauge is output to the control circuit 100 at all times or at a predetermined sampling cycle (for example, 10 msec to several seconds). In other words, the control circuit 100 monitors the pressure measured by each pressure gauge at all times or at a predetermined sampling cycle (for example, 10 msec to several seconds). Further, a pressure (D) of the fuel tank 202 mounted on the FCV vehicle 200 is measured by a pressure gauge 206 mounted on the FCV vehicle 200. As will be described later, the pressure of the fuel tank 202 mounted on the FCV vehicle 200 is monitored at all times or at a predetermined sampling cycle (for example, 10 msec to several seconds) while the communication between the on-board device 204 and the control circuit 43 is established.

In a state where the hydrogen fuel accumulated in the curdle, the intermediate accumulator, or the tank of the hydrogen trailer is decompressed to a low pressure (for example, 0.6 MPa) by each regulator (not shown) controlled by the control circuit 100, the hydrogen fuel is supplied to the suction side of the compressor 40. Similarly, the hydrogen fuel produced by the hydrogen producing apparatus is supplied to the suction side of the compressor 40 at a low pressure (for example, 0.6 MPa). Under the control of the control circuit 100, the compressor 40 supplies the hydrogen fuel supplied at low pressure to the accumulators 10, 12, and 14 of the multi-stage accumulator 101 while compressing the hydrogen fuel. The compressor 40 performs compression until the internal pressure of each of the accumulators 10, 12, and 14 of the multi-stage accumulator 101 becomes a predetermined high pressure (for example, 82 MPa). In other words, the compressor 40 performs compression until a secondary side pressure $P_{OUT}$ of the discharge side becomes a predetermined high pressure (for example, 82 MPa). Whether a partner supplying the hydrogen fuel to the suction side of the compressor 40 is the curdle, the intermediate accumulator, the hydrogen trailer, or the hydrogen production apparatus may be determined by control of the control circuit 100. Similarly, whether a partner to which the compressor 40 supplies the hydrogen fuel is the accumulator 10, 12, or 14 may be determined by controlling opening/closing of the corresponding valves 21, 23, and 25 disposed on the respective pipes by the control circuit 100. Alternatively, control may be performed so that the hydrogen fuel is supplied two or more accumulators at the same time.

In the example described above, the case where control is performed so that a pressure $P_{IN}$ for supplying the hydrogen fuel to the suction side of the compressor 40 is reduced to a predetermined low pressure (for example, 0.6 MPa) has been shown. However, the present invention is not limited thereto. The hydrogen fuel accumulated in the curdle, the intermediate accumulator, or the hydrogen trailer may be supplied to the suction side of the compressor 40 without reducing the pressure or at a pressure higher than a predetermined low pressure (for example, 0.6 MPa), and may be decompressed.

The hydrogen fuel accumulated in the multi-stage accumulator 101 is cooled by the cooler 32 in the dispenser 30 and is supplied from the dispenser 30 to the FCV vehicle 200 arriving at the inside of the hydrogen station 102.

Figure 2:
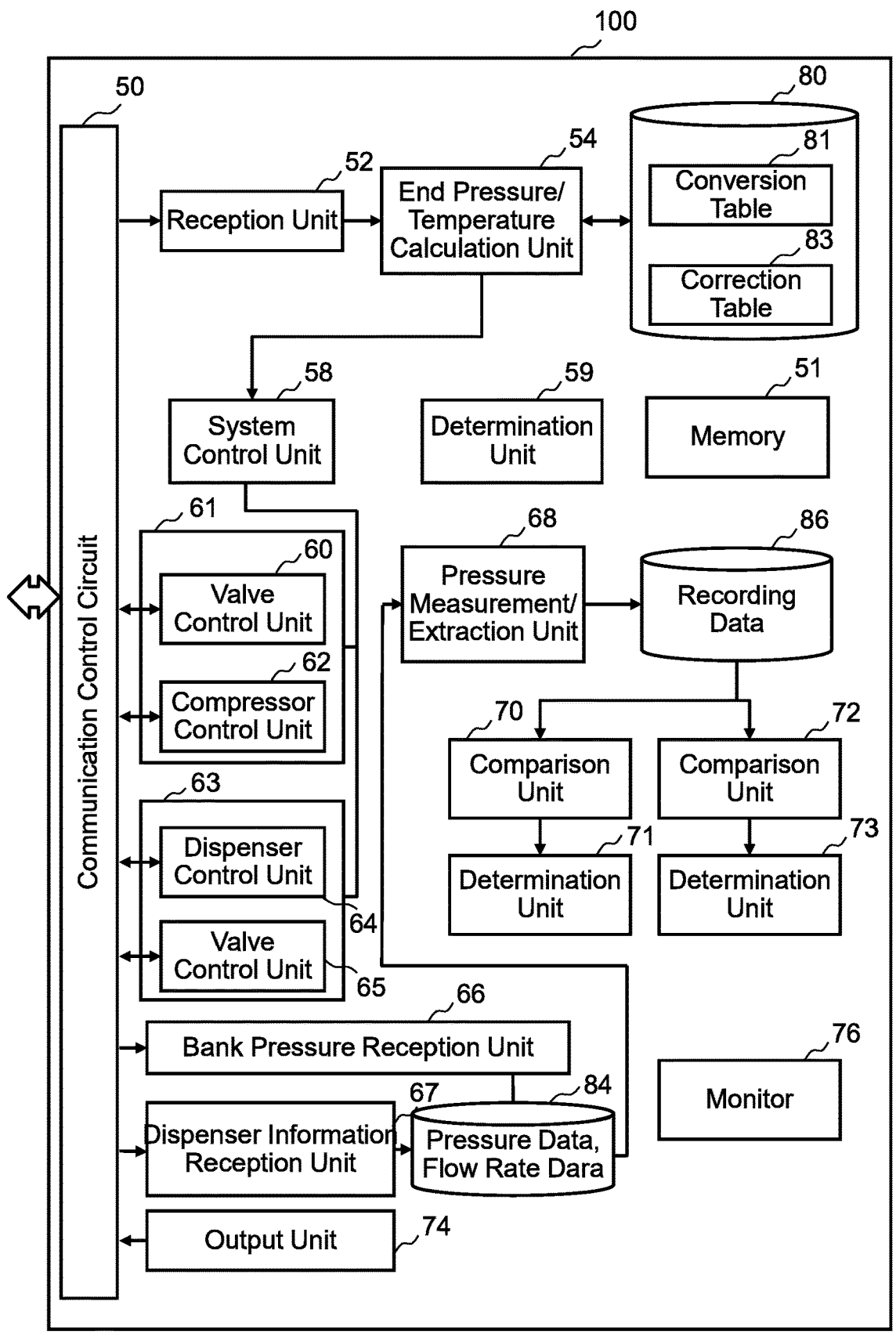
FIG. 2 is a configuration diagram showing an example of an internal configuration of a control circuit that controls the entire hydrogen filling system in the first embodiment.

FIG. 2 is a configuration diagram showing an example of an internal configuration of the control circuit that controls the entire hydrogen filling system in the first embodiment. In FIG. 2, a communication control circuit 50, a memory 51, a reception unit 52, an end pressure/temperature calculation unit 54, a system control unit 58, a determination unit 59, a pressure recovery control unit 61, a supply control unit 63, a bank pressure reception unit 66, dispenser information reception unit 67, a pressure measurement/extraction unit 68, a comparison unit 70, a determination unit 71, a comparison unit 72, a determination unit 73, an output unit 74, a monitor 76, and storage devices 80, 84, and 86 such as magnetic disk devices are disposed in the control circuit 100. The pressure recovery control unit 61 has a valve control unit 60 and a compressor control unit 62. The supply control unit 63 has a dispenser control unit 64 and a valve control unit 65. Each "unit" such as the reception unit 52, the end pressure/temperature calculation unit 54, the system control unit 58, the determination unit 59, the pressure recovery control unit 61 (the valve control unit 60 and the compressor control unit 62), the supply control unit 63 (the dispenser control unit 64 and the valve control unit 65), the bank pressure reception unit 66, the dispenser information reception unit 67, the pressure measurement/extraction unit 68, the comparison unit 70, the determination unit 71, the comparison unit 72, the determination unit 73, and the output unit 74 includes a processing circuit, and an electric circuit, a computer, a processor, a circuit board, or a semiconductor device is included in the processing circuit. Further, a common processing circuit (same processing circuit) may be used for each "unit". Alternatively, a different processing circuit (separate processing circuit) may be used. Input data required in the reception unit 52, the end pressure/temperature calculation unit 54, the system control unit 58, the determination unit 59, the pressure recovery control unit 61 (the valve control unit 60 and the compressor control unit 62), the supply control unit 63 (the dispenser control unit 64 and the valve control unit 65), the bank pressure reception unit 66, the dispenser information reception unit 67, the pressure measurement/extraction unit 68, the comparison unit 70, the determination unit 71, the comparison unit 72, the determination unit 73, and the output unit 74, or calculated results are stored in the memory 51 each time.

Further, a conversion table 81 showing a correlation between FCV information such as the pressure, the temperature, and the volume of the fuel tank 202 mounted on the FCV vehicle 200, a remaining amount of the hydrogen fuel corresponding to the FCV information, and filling information such as a final pressure and a final temperature for filling the fuel tank 202 with the hydrogen fuel is stored in the storage device 80. Further, a correction table 83 for correcting a result obtained from the conversion table 81 is stored in the storage device 80.

Here, as described above, the plurality of pressure gauges 11, 13, 15, 19, 21, and 23 disposed in the middle of the flow passage for supplying the hydrogen fuel from the multi-stage accumulator 101 disposed in the hydrogen station 102 to the outlet of the dispenser 30 are required by law to have a calibration inspection every two years. The pressure gauge in the hydrogen station 102 is generally calibrated at a factory by removing it. However, conventionally, it is not possible to grasp failures occurring within a two-year period until a next legal inspection, after the calibration. If the pressure gauge is removed and a calibration inspection is performed at the factory, separately from the legal inspection, within the period until the next legal inspection, this requires cost and time. Further, during the inspection, an operation of the hydrogen filling system 500 of the hydrogen station 102 is stopped. For this reason, a method capable of confirming accuracy at low cost during a normal operation is demanded. Therefore, in The first embodiment, failures of the plurality of pressure gauges 11, 13, 15, 19, 21, and 23 are diagnosed by using the normal operation of the hydrogen filling system 500.

Figure 3:
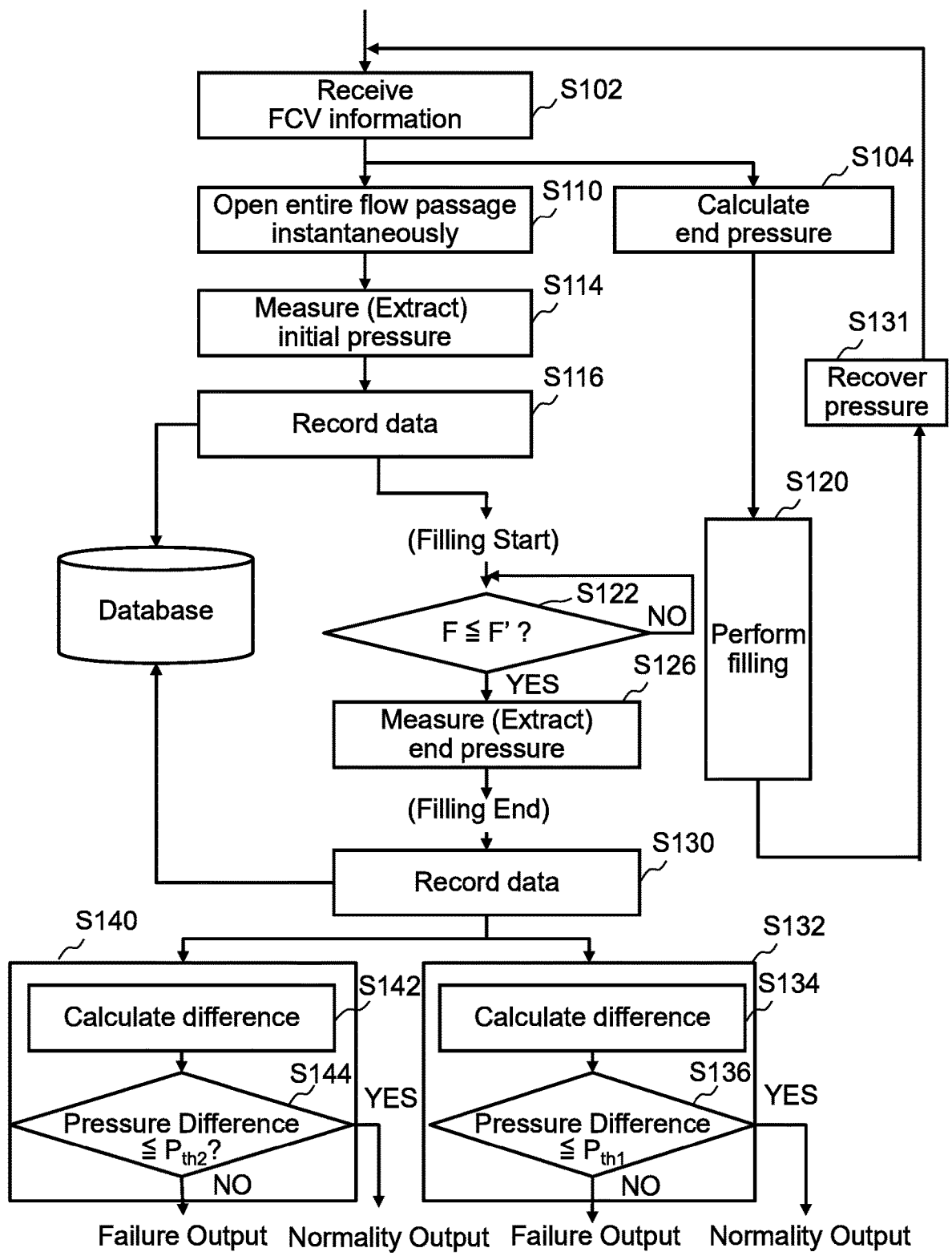
FIG. 3 is a flowchart showing main steps of a hydrogen filling method in the first embodiment.

FIG. 3 is a flowchart showing main steps of a hydrogen filling method in the first embodiment. In FIG. 3, the hydrogen filling method in The first embodiment executes a series of steps such as an FCV information reception step (S102), an end pressure calculation step (S104), an entire flow passage instantaneous opening step (S110), an initial pressure measurement step (S114), a data recording step (S116), a filling step (S120), a flow rate determination step (S122), an end pressure measurement (extraction) step (S126), a data recording step (S130), a pressure recovery step (S131), an end pressure failure determination step (S132), and an initial pressure failure determination step (S140). The end pressure failure determination step (S132) executes a difference calculation step (S134) and a pressure difference determination step (S136) as internal steps. The initial pressure failure determination step (S140) executes a difference calculation step (S142) and a pressure difference determination step (S144) as internal steps. Among these steps, the failure diagnosis method for the pressure gauges 11, 13, 15, 19, 21, and 23 of the hydrogen filling system 500 in The first embodiment executes a series of steps such as the initial pressure measurement step (S114), the data recording step (S116), the flow rate determination step (S122), the end pressure measurement (extraction) step (S126), the data recording step (S130), the end pressure failure determination step (S132), and the initial pressure failure determination step (S140).

As the FCV information reception step (S102), the reception unit 52 receives FCV information regarding the fuel tank 202 (hydrogen storage container) mounted on the FCV vehicle 200 from the on-board device 204 mounted on the FCV vehicle 200 (fuel cell vehicle (FCV)) powered by the hydrogen fuel. Specifically, the following operation is performed. When the FCV vehicle 200 arrives at the inside of the hydrogen station 102 and the nozzle 44 of the dispenser 30 is fixed to a reception port (receptacle) of the fuel tank 202 of the FCV vehicle 200 by a user or an operator of the hydrogen station 102, communication between the on-board device 204 and the control circuit 43 (relay device) is established. When the communication is established, the FCV information such as the current pressure and temperature of the fuel tank 202 and the volume of the fuel tank 202 is output the on-board device 204 is output (transmitted) in real time, from the on-board device 204. The FCV information is relayed by the control circuit 43 and transmitted to the control circuit 100. In the control circuit 100, the reception unit 52 receives the FCV information via the communication control circuit 50. The FCV information is monitored at all times or at predetermined sampling intervals (for example, 10 msec to several seconds) while the communication between the on-board device 204 and the control circuit 43 is established. The received FCV information is stored in the storage device 80 together with reception time information. The control circuit 100 also receives an outside air temperature measured by a thermometer (not shown).

As the end pressure calculation step (S104), the end pressure/temperature calculation unit 54 reads the conversion table 81 from the storage device 80, and calculates and predicts a final pressure PF and a final temperature corresponding to the pressure, temperature, and volume of the fuel tank 202 and the outside air temperature at the time of initial reception, which have been received. Further, the end pressure/temperature calculation unit 54 reads the correction table 83 from the storage device 80, and corrects a numerical value obtained by the conversion table 81. When only data of the conversion table 81 has a large error in an obtained result, the correction table 83 may be provided on the basis of a result obtained by an experiment or a simulation. The calculated final pressure PF and final temperature are output to the system control unit 58.

Here, in the hydrogen filling system 500, as one of the normal operations, when the communication between the on-board device 204 and the control circuit 43 is established, before the hydrogen filling of the FCV vehicle 200 is started, the initial pressure of the hydrogen fuel in the flow passage of the hydrogen fuel from the multi-stage accumulator 101 to the FCV vehicle 200 filled with the hydrogen fuel is checked. Therefore, the following operation is performed.

As the entire flow passage instantaneous opening step (S110), after the flow passage of the hydrogen fuel from the first bank, for example, the accumulator 10 to the FCV vehicle 200 filled with the hydrogen fuel is temporarily opened, the shut-off valve 36 of the dispenser 30 is closed. In other words, the flow passage is opened for a moment. The system control unit 58 controls the dispenser control unit 64 and the valve control unit 65. The dispenser control unit 64 communicates with the control circuit 43 of the dispenser 30 via the communication control circuit 50, and opens the shut-off valves 36 and 38 in the dispenser 30. In synchronization with this, the valve control unit 65 opens the valve 22 via the communication control circuit 50. The valves 24 and 26 are closed. By such valve control, the flow passage of the hydrogen fuel from the first bank, for example, the accumulator 10 to the FCV vehicle 200 filled with the hydrogen fuel is opened. Then, immediately, the dispenser control unit 64 communicates with the control circuit 43 of the dispenser 30 via the communication control circuit 50, and closes the shut-off valve 36 in the dispenser 30. The shut-off valve 38 may be synchronized and closed together. As a result, the hydrogen fuel is supplied from the accumulator 10 to the fuel tank 202 for a moment. The pressure data measured by the pressure gauges 11, 13, 15, and 19 during the operation is received by the bank pressure reception unit 66 and stored in the storage device 84 in association with the date and time of reception. Similarly, the pressure data measured by the pressure gauges 27 and 23 is received by the dispenser information reception unit 67 via the control circuit 43 and stored in the storage device 84 in association with the date and time of reception.

As the initial pressure measurement (extraction) step (S114), at timing when the shut-off valve 36 of the dispenser 30 is closed after temporarily opening the flow passage of the hydrogen fuel from the 1st bank (for example, the accumulator 10) to the FCV vehicle 200 filled with the hydrogen fuel, the pressure measurement/extraction unit 68 measures the pressures measured by the plurality of pressure gauges 11 (13 or 15), 19, and 27 disposed at different positions in the flow passage of the hydrogen fuel between the accumulator 10 and just before the shut-off valve 36 of the dispenser 30. Specifically, the pressure measurement/extraction unit 68 extracts the pressures measured by the plurality of pressure gauges 11 (13 or 15), 19, and 27 at the timing immediately after the flow passage is opened for a moment in the entire flow passage instantaneous opening step (S110), from the storage device 84.

As the data recording step (S116), the pressure measurement/extraction unit 68 records each of the extracted (input, or acquired) pressures, which are measured by the plurality of pressure gauges 11 (13 or 15), 19, and 27, in association with the date and time. Specifically, the pressure measurement/extraction unit 68 records each of the pressures measured by the plurality of pressure gauges 11 (13 or 15), 19, and 27 at the timing when the flow passage is opened for a moment in the entire flow passage instantaneous opening step (S110), which have been extracted from the storage device 84, in the storage device 86 as recording data of the initial pressure in association with the date and time.

FIG. 4 is a diagram showing an example of the recording data of the initial pressure in The first embodiment. In FIG. 4, pressures measured on different dates are recorded. A case where pressures A1, A3, C2, and D are not recorded in the recording data of the initial pressure when a date is "2017/10/1" is shown. This indicates that the accumulator 12 of the multi-stage accumulator 101 has been used as the 1st bank at the time of measuring the initial pressure. Therefore, pressures A1 and A3 of the other accumulators 10 and 14 are excluded from recording. Since the pressure after closing the shut-off valve 36 is recorded as the initial pressure, the pressures C2 and D of the secondary side from the shut-off valve 36 are also excluded from recording. Further, a case where the pressures A2, A3, C2, and D are not recorded in the recording data of the initial pressure when dates are "2017/11/1", "2017/12/1", and "2018/1/1" is shown. This indicates that the accumulator 10 of the multi-stage accumulator 101 has been used as the 1st bank at the time of measuring the initial pressure. Therefore, the pressures A2 and A3 of the other accumulators 12 and 14 are excluded from recording. The pressures C2 and D of the secondary side from the shut-off valve 36 are also excluded from recording as described above. In The first embodiment, it is not necessary to record a plurality of initial pressure data on the same day or in a few days because it is desired to diagnose whether or not each pressure gauge has a failure over time. For a plurality of FCV vehicles 200 that have arrived at different days and times for being filled with the hydrogen fuel, each time each FCV vehicle 200 is filled with the hydrogen fuel, the initial pressure may be measured and the recording data may be accumulated, before starting to fill the FCV vehicle 200 with the hydrogen fuel. For example, the recording data of the initial pressure may be accumulated every week, every month, or every few months. Of course, although an amount of data increases, a plurality of data on the same day or in a few days may be recorded.

On the other hand, as one of the normal operations, each time the FCV vehicle 200 arrives even on the same day, the system control unit 58 reads the pressures measured by the plurality of pressure gauges 11, 13, 15, 19, and 27 at the same timing, from the storage device 84, and determines whether or not a pressure of the FCV vehicle 200 arrived for being filled with hydrogen is within a range that does not interfere with hydrogen filling. If each pressure is within the range that does not interfere with hydrogen filling, the filling operation is advanced. As described above, the recording data of the initial pressure to be used for the failure diagnosis can be acquired by using the normal operation.

As the filling step (S120), the FCV vehicle 200 is filled with the hydrogen fuel from the multi-stage accumulator 101 in which the hydrogen fuel has been accumulated through the dispenser 30.

Figure 5:
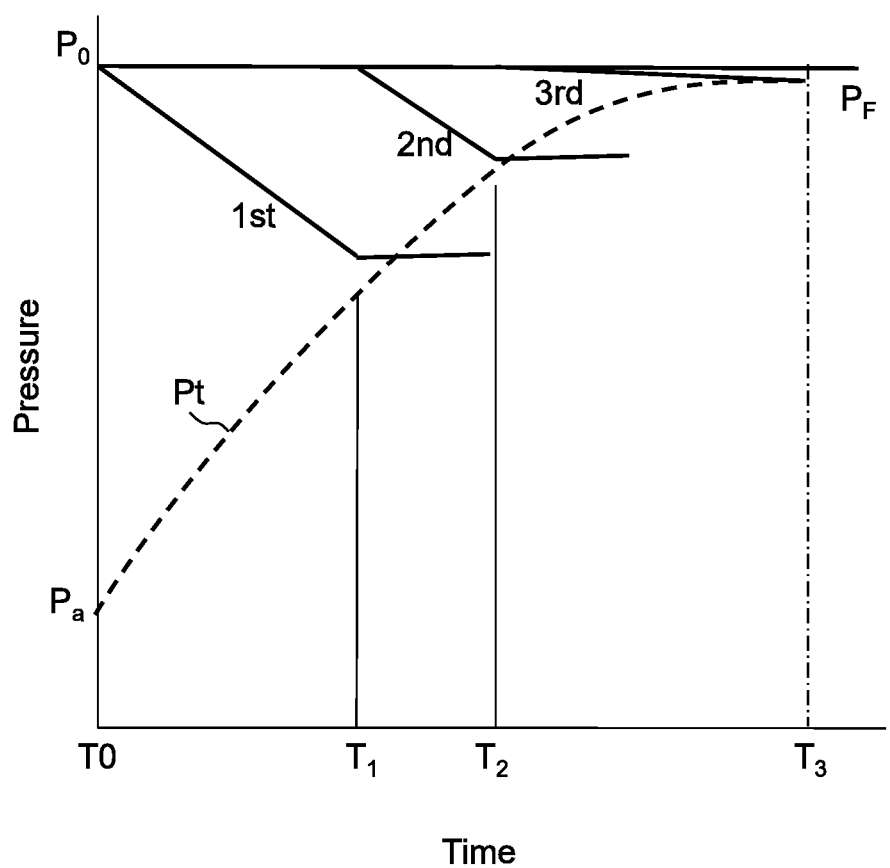
FIG. 5 is a diagram illustrating a filling method in a case of performing differential pressure filling of hydrogen fuel by using a multi-stage accumulator in the first embodiment.

FIG. 5 is a diagram illustrating a filling method in a case of performing differential pressure filling of the hydrogen fuel by using the multi-stage accumulator in The first embodiment. In FIG. 5, a vertical axis represents a pressure and a horizontal axis represents a time. In the case of performing the differential pressure filling of the hydrogen fuel on the FCV vehicle 200, the accumulators 10, 12, and 14 of the multi-stage accumulator 101 are normally accumulated in advance at the same pressure P0 (for example, 82 MPa). On the other hand, the pressure of the fuel tank 202 of the FCV vehicle 200 that has arrived at the hydrogen station 102 becomes a pressure Pa. A case where filling starts for the fuel tank 202 of the FCV vehicle 200 from the above state will be described.

First, the filling starts from the 1st bank, for example, the accumulator 10 to the fuel tank 202. Specifically, the following operation is performed. Under the control of the system control unit 58, the supply control unit 63 controls the supply unit 106, and supplies the hydrogen fuel from the accumulator 10 to the fuel tank 202 of the FCV vehicle 200. Specifically, the system control unit 58 controls the dispenser control unit 64 and the valve control unit 65. The dispenser control unit 64 communicates with the control circuit 43 of the dispenser 30 via the communication control circuit 50, and controls the operation of the dispenser 30. Specifically, the valve control unit 90 opens the shut-off valves 36 and 38 in the dispenser 30. Then, the valve control unit 65 outputs a control signal to the valves 22, 24, and 26 via the communication control circuit 50, and controls opening/closing of each valve. Specifically, the valve 22 is opened and the valves 24 and 26 are kept closed. As a result, the hydrogen fuel is supplied from the accumulator 10 to the fuel tank 202. The hydrogen fuel accumulated in the accumulator 10 by the pressure difference between the accumulator 10 and the fuel tank 202 moves to the side of the fuel tank 202 at a desired flow rate per unit time (filling speed), and the pressure of the fuel tank 202 gradually increases as indicated by a dotted line Pt. Accordingly, the pressure (graph indicated by "1st") of the accumulator 10 gradually decreases. Then, at a point of time when a time T1 elapses from the start of filling, which falls outside a use lower limit pressure of the 1st bank, an accumulator used in the 2nd bank, for example, the accumulator 12 is switched from the accumulator 10. Specifically, the valve control unit 65 outputs a control signal to the valves 22, 24, and 26 via the communication control circuit 50, and controls opening/closing of each valve. Specifically, the valve 24 is opened, the valve 22 is closed, and the valve 26 is kept closed. As a result, since the pressure difference between the accumulator 12 and the fuel tank 202 increases, the filling speed can be kept high.

Then, the hydrogen fuel accumulated in the accumulator 12 by the pressure difference between the 2nd bank, for example, the accumulator 12 and the fuel tank 202 moves to the side of the fuel tank 202 at a desired flow rate per unit time (filling speed), and the pressure of the fuel tank 202 gradually increases as indicated by the dotted line Pt. Accordingly, the pressure (graph indicated by "2nd") of the accumulator 12 gradually decreases. Then, at a point of time when a time T2 elapses from the start of filling, which falls outside a use lower limit pressure of the 2nd bank, an accumulator used in the 3rd bank, for example, the accumulator 14 is switched from the accumulator 12. Specifically, the valve control unit 65 outputs a control signal to the valves 22, 24, and 26 via the communication control circuit 50, and controls opening/closing of each valve. Specifically, the valve 26 is opened, the valve 24 is closed, and the valve 22 is kept closed. As a result, since the pressure difference between the accumulator 14 and the fuel tank 202 increases, the filling speed can be kept high.

Then, the hydrogen fuel accumulated in the accumulator 14 by the pressure difference between the 3rd bank, for example, the accumulator 14 and the fuel tank 202 moves to the side of the fuel tank 202 at a desired flow rate per unit time (filling speed), and the pressure of the fuel tank 202 gradually increases as indicated by the dotted line Pt. Accordingly, the pressure (graph indicated by "3rd") of the accumulator 14 gradually decreases. Then, filling is performed until the pressure of the fuel tank 202 becomes a calculated final pressure PF (for example, 65 to 81 MPa) by the accumulator 14 to be the 3rd bank.

Here, the FCV vehicle 200 arriving at the hydrogen station 102 is not limited to a case where the pressure of the fuel tank 202 is sufficiently low. When the pressure of the fuel tank 202 is higher than, for example, ½ of the pressure when the tank is full, for example, the two accumulators 10 and 12 may be sufficient. Furthermore, when the pressure of the fuel tank 202 is high, for example, one accumulator 10 may be sufficient. The pressure of the fuel tank 202 is monitored as a part of the FCV information at all times or at predetermined sampling intervals while the communication between the on-board device 204 and the control circuit 43 is established. Then, the system control unit 58 ends the filling when the current pressure of the fuel tank 202 defined by the FCV information reaches the final pressure PF. Specifically, under the control of the system control unit 58, the dispenser control unit 64 closes the shut-off valves 36 and 38 via the control circuit 43.

While the hydrogen filling is performed, flow rate data of the hydrogen fuel measured by the flowmeter 37 in the dispenser 30 (flow rate data per unit time: filling speed) is output to the control circuit 100 at all times or at a predetermined sampling cycle (for example, 10 msec to several seconds). In the control circuit 100, the dispenser information reception unit 67 receives the flow rate data via the communication control circuit 50, and stores the flow rate data in the storage device 84 in association with the reception date and time.

As the flow rate determination step (S122), the determination unit 59 determines whether or not a flow rate F of the hydrogen fuel to be filled at a stage close to the filling end has become a threshold value F' or less. Specifically, the following operation is performed. As the current pressure of the fuel tank 202 approaches the final pressure PF, the pressure difference decreases, so that the flow rate of the flowing hydrogen fuel gradually decreases. At a final stage, since the pressure difference between the 3rd bank, for example, the accumulator 14 and the fuel tank 202 is small, filling is continuously performed until the pressure of the fuel tank 202 reaches the final pressure PF with the flow rate close to zero. Therefore, the determination unit 59 reads the flow rate data from the storage device 84, and determines whether or not the flow rate F is the threshold value F' or less, for example, 100 g/min or less, preferably 50 mg/min or less, at a stage before closing the shut-off valves 36 and 38. When the flow rate F is the threshold value F' or less, for example, 100 g/min or less, preferably 50 mg/min or less, the flow rate F can be substantially regarded as zero, which means that the pressure difference between the accumulator 14 and the fuel tank 202 is substantially eliminated. Therefore, the pressures A3 (A1 or A2), B, C1, C2, and D at this timing should be almost the same values.

As the end pressure measurement (extraction) step (S126), at timing when the flow rate F of the hydrogen fuel to be filled at the stage close to the filling end becomes the threshold value F' or less, the pressure measurement/extraction unit 68 measures the pressures measured by the plurality of pressure gauges 15 (11 or 13), 19, 21, and 23 disposed at different positions in the flow passage of the hydrogen fuel between the accumulator 14 and the outlet of the dispenser 30. Specifically, the pressure measurement/extraction unit 68 extracts the pressures measured by the plurality of pressure gauges 15 (11 or 13), 19, 27, and 28 at the timing when the flow rate F becomes the threshold value F' or less in the flow rate determination step (S122), from the storage device 84. Further, the pressure measurement/extraction unit 68 extracts the pressure D of the fuel tank 202 of the FCV vehicle 200 at the same timing from the storage device 80.

As the data recording step (S130), the pressure measurement/extraction unit 68 records each of the extracted (input, or acquired) pressures, which are measured by the plurality of pressure gauges 15 (11 or 13), 19, 27, 28, and 206, in association with the date and time. Specifically, the pressure measurement/extraction unit 68 records each of the pressures A3 (A1 or A2), B, C1, and C2 measured by the plurality of pressure gauges 11 (13 or 15), 19, and 27 at the timing when the flow rate F becomes the threshold value F' or less in the flow rate determination step (S122), which have been extracted from the storage device 84, in the storage device 86 as recording data of the end pressure in association with the date and time. Further, the pressure measurement/extraction unit 68 records the pressure D of the fuel tank 202 of the FCV vehicle 200 at the timing when the flow rate F becomes the threshold value F' or less in the flow rate determination step (S122), in the storage device 86 as recording data of the end pressure in association with the date and time.

FIG. 6 is a diagram showing an example of the recording data of the end pressure in The first embodiment. In FIG. 6, each pressure measured at a certain date is recorded. In the example of FIG. 6, each pressure measured when a date is "2018/1/20" is recorded. In the example of FIG. 6, a case where the pressures A1 and A2 are not recorded is shown. This indicates that the accumulator 14 of the multi-stage accumulator 101 has been used as the 3rd bank at the time of measuring the end pressure. Therefore, the pressures A1 and A2 of the other accumulators 10 and 12 are excluded from recording. In The first embodiment, it is not necessary to record a plurality of end pressure data on the same day or in a few days because it is desired to diagnose whether or not each pressure gauge has a failure over time. The end pressures of the plurality of FCV vehicles 200 arrived for being filled with the hydrogen fuel on different dates and times may be measured, and the recording data may be accumulated. For example, the recording data of the initial pressure may be accumulated every week, every month, or every few months. Of course, although an amount of data increases, a plurality of data on the same day or in a few days may be recorded.

As described above, the filling (supply) of the hydrogen fuel into the fuel tank 202 of the FCV vehicle 200 ends, the nozzle 44 of the dispenser 30 is removed from the reception port (receptacle) of the fuel tank 202 of the FCV vehicle 200, and the user leaves the hydrogen station 102 after paying cost according to the filling amount, for example.

On the other hand, due to the filling, the hydrogen fuel in each of the accumulators 10, 12, and 14 is reduced and the pressure is reduced.

As the pressure recovery step (S131), a pressure recovery mechanism 104 recovers the pressure of each of the accumulators 10, 12, and 14. The compressor 40 and the valves 21, 23, and 25 configure the pressure recovery mechanism 104. First, the system control unit 58 selects a supply source of the hydrogen fuel to be connected to the suction side of the compressor 40 from the curdle, the intermediate accumulator, the hydrogen trailer, or the hydrogen production apparatus (not shown). Then, under the control of the system control unit 58, the pressure recovery control unit 61 controls the pressure recovery mechanism 104, and recovers the pressure of each of the accumulators 10, 12, and 14. Specifically, the following operation is performed. In the accumulator of each bank used for filling the fuel tank 202 of the FCV vehicle 200, the pressure may also be recovered during filling. However, since there is not enough time to recover the pressure to a prescribed pressure, the pressure should be recovered after filling. Since the 1st bank, the 2nd bank, and the 3rd bank are switched in this order, first, the pressure of the accumulator 10 to be the 1st bank is recovered. The valve control unit 60 opens the valve 21 from a state where the valves 21, 23, and 25 are closed.

Then, the compressor control unit 62 drives the compressor 40, sends the hydrogen fuel of the low pressure (for example, 0.6 MPa) from the supply source of the hydrogen fuel while compressing the hydrogen fuel, and fills the accumulator 10 with the hydrogen fuel until the pressure of the accumulator 10 becomes a predetermined pressure P0 (for example, 82 MPa), thereby recovering the pressure of the accumulator 10.

Next, the valve control unit 60 closes the valve 21, and opens the valve 23 instead.

Then, the compressor control unit 62 drives the compressor 40, sends the hydrogen fuel of the low pressure (for example, 0.6 MPa) while compressing the hydrogen fuel, and fills the accumulator 12 with the hydrogen fuel until the pressure of the accumulator 12 becomes the predetermined pressure P0 (for example, 82 MPa), thereby recovering the pressure of the accumulator 12.

Next, the valve control unit 60 closes the valve 23, and opens the valve 25 instead.

Then, the compressor control unit 62 drives the compressor 40, sends the hydrogen fuel of the low pressure (for example, 0.6 MPa) while compressing the hydrogen fuel, and fills the accumulator 14 with the hydrogen fuel until the pressure of the accumulator 14 becomes the predetermined pressure P0 (for example, 82 MPa), thereby recovering the pressure of the accumulator 14.

As described above, even when the next FCV vehicle 200 arrives at the hydrogen station 102, the hydrogen fuel can be similarly supplied. By sequentially filling the plurality of FCV vehicles 200 with the hydrogen fuel on different dates, recording data of the initial pressure on a plurality of dates is accumulated. Similarly, recording data of the end pressure on a plurality of dates is accumulated.

As the end pressure failure determination step (S132), at timing when the flow rate F of the hydrogen fuel to be filled at the stage close to the filling end becomes the threshold value F' or less, the control circuit 100 inputs (acquires) the pressures measured by the plurality of pressure gauges disposed at different positions in the flow passage of the hydrogen fuel between the accumulator 14 and the outlet of the dispenser 30, determines whether or not a deviation between the pressures is within a threshold value on the basis of acquired pressure values, and outputs a determination result. Specifically, the following operation is performed.

As the difference calculation step (S134), the comparison unit 70 reads the recording data of the end pressure from the storage device 86, and calculates a deviation between the recorded pressures A1 to C2. Since the final pressure PF is different for each FCV vehicle filled with the hydrogen fuel, it is difficult to set a reference pressure uniquely. Therefore, for example, one of the recorded pressures A1 to C2 is used as the reference pressure, and a difference between each of the recorded pressures A1 to C2 and the reference pressure is calculated. Alternatively, the pressure D of the fuel tank 202 of the FCV vehicle 200 is used as the reference pressure, and the difference between each of the recorded pressures A1 to C2 and the reference pressure is calculated.

As the pressure difference determination step (S136), the determination unit 71 determines whether or not the difference between each of the recorded pressures A1 to C2 and the reference pressure, which has been calculated for each pressure, is within an allowable value Pth1. Simultaneous failures of the plurality of pressure gauges do not normally occur. Therefore, when the difference is within the allowable value Pth1, it is determined that the corresponding pressure gauge is normal. Conversely, when the difference is not within the allowable value Pth1, it is determined that the corresponding pressure gauge is out of order. If it is determined that two or more pressure gauges are simultaneously out of order, the pressure gauge of which the pressure is used as the reference pressure may be changed to another pressure gauge and the same processing may be performed. In the example of FIG. 6, only the pressure C1 greatly decreases as compared with the other pressures. Therefore, the difference between the pressure C1 and the reference pressure increases. Therefore, it can be determined that the pressure gauge 27 measuring the pressure C1 is out of order. A determination result is output to, for example, the monitor 76 to be displayed on the monitor 76, together with a measurement date. Alternatively/additionally, the measurement result is output from the output unit 74 to the outside via the communication control circuit 50.

As described above, failures of the plurality of pressure gauges disposed in the flow passage from the accumulator 14 to the inside of the dispenser 30 can be diagnosed by using the end pressure obtained by using the normal operation of hydrogen filling. In other words, accuracy of the plurality of pressure gauges can be confirmed. Therefore, it is possible to diagnose failures occurring within a two-year period until a next legal inspection. Further, when the recording data of the end pressure is accumulated on different dates, a transition of measurement accuracy of each pressure gauge can be known. Therefore, it is possible to obtain an index for when the failure occurs during the two-year period. Further, when a degree of the failure does not satisfy required accuracy of the legal inspection, the pressure gauge can be replaced/repaired without waiting for a next legal inspection.

As the initial pressure failure determination step (S140), for each of the pressures measured by the plurality of pressure gauges 11 (13 or 15), 19, and 27 disposed at different positions in the flow passage of the hydrogen fuel between the accumulator 10 (12 or 14) and just before the shut-off valve 36 of the dispenser 30, the control circuit 100 determines whether or not a pressure change in the transition of each pressure recorded at a different date for each pressure gauge is within a threshold value, and outputs a determination result. Specifically, the following operation is performed. The initial pressure failure determination step (S140) is executed when recording data of a plurality of initial pressures with different dates obtained when the plurality of FCV vehicles 200 arrive for being filled with the hydrogen on different dates is accumulated.

As the difference calculation step (S142), the comparison unit 72 reads the recording data of the initial pressure from the storage device 86, and calculates a deviation between measurement values of the same pressure gauge for each of the recorded pressures A1 to C1. For example, each of the pressures A1 to C1 in recording data recorded at one of a plurality of dates is used as the reference pressure, and for each of the pressures A1 to C1 to be recorded, a difference between the measurement value of the same pressure gauge and the corresponding reference pressure is calculated.

As the pressure difference determination step (S144), the determination unit 73 determines whether or not the difference between each of the recorded pressures A1 to C1 and the reference pressure, which has been calculated for each pressure, is within an allowable value Pth2. Therefore, when the difference is within the allowable value Pth2, it is determined that the corresponding pressure gauge is normal. Conversely, when the difference is not within the allowable value Pth2, it is determined that the corresponding pressure gauge is out of order. In the example of FIG. 4, a pressure B measured on "2018/1/1" greatly decreases as compared with the pressures B measured on other dates. Therefore, the difference between the pressure B and the reference pressure increases. Therefore, at a point of time "2018/1/1", it can be determined that the pressure gauge 19 that has measured the pressure B is out of order. A determination result is output to, for example, the monitor 76 to be displayed on the monitor 76, together with a measurement date. Alternatively/additionally, the measurement result is output from the output unit 74 to the outside via the communication control circuit 50.

As described above, failures of the plurality of pressure gauges disposed in the flow passage from the accumulator 10 to the inside of the dispenser 30 can be diagnosed by using the initial pressure obtained by using the normal operation of hydrogen filling. In other words, accuracy of the plurality of pressure gauges can be confirmed. Therefore, it is possible to diagnose failures occurring within a two-year period until a next legal inspection. Further, when the recording data of the initial pressure is accumulated on different dates, a transition of measurement accuracy of each pressure gauge can be known. Therefore, it is possible to obtain an index for when the failure occurs during the two-year period. Further, when a degree of the failure does not satisfy required accuracy of the legal inspection, the pressure gauge can be replaced/repaired without waiting for a next legal inspection.

Here, in the example described above, the case where both the failure diagnosis based on the end pressure and the failure diagnosis based on the initial pressure are performed has been described. However, the present invention is not limited thereto. Only one of the failure diagnosis based on the end pressure and the failure diagnosis based on the initial pressure may be performed.

Further, in the failure diagnosis based on the end pressure, since the data of the accumulator to be the final bank is recorded, the accumulator to be the final bank in the multi-stage accumulator 101 is operated instead, so that the failure of the pressure gauge of each accumulator can be diagnosed. Conversely, in the failure diagnosis based on the initial pressure, since the data of the accumulator to be the 1st bank is recorded, the accumulator to be the 1st bank in the multi-stage accumulator 101 is operated instead, so that the failure of the pressure gauge of each accumulator can be diagnosed.

As described above, according to The first embodiment, it is possible to confirm accuracy of the plurality of pressure gauges disposed at least in the flow passage from the accumulator to the inside of the dispenser at low cost by using the normal operation. Therefore, it is possible to diagnose failures occurring within a two-year period until a next legal inspection.

Second Embodiment

In the first embodiment, a case where determination timing of an end pressure is timing when a flow rate F becomes equal to or less than a threshold value F' at which the flow rate F can be regarded as substantially zero has been described. However, a determination method is not limited thereto. In a second embodiment, a configuration in which the determination timing of the end pressure is performed by another determination method will be described. A configuration of a hydrogen filling system of a hydrogen station in the second embodiment is the same as that in FIG. 1.

Figure 7:
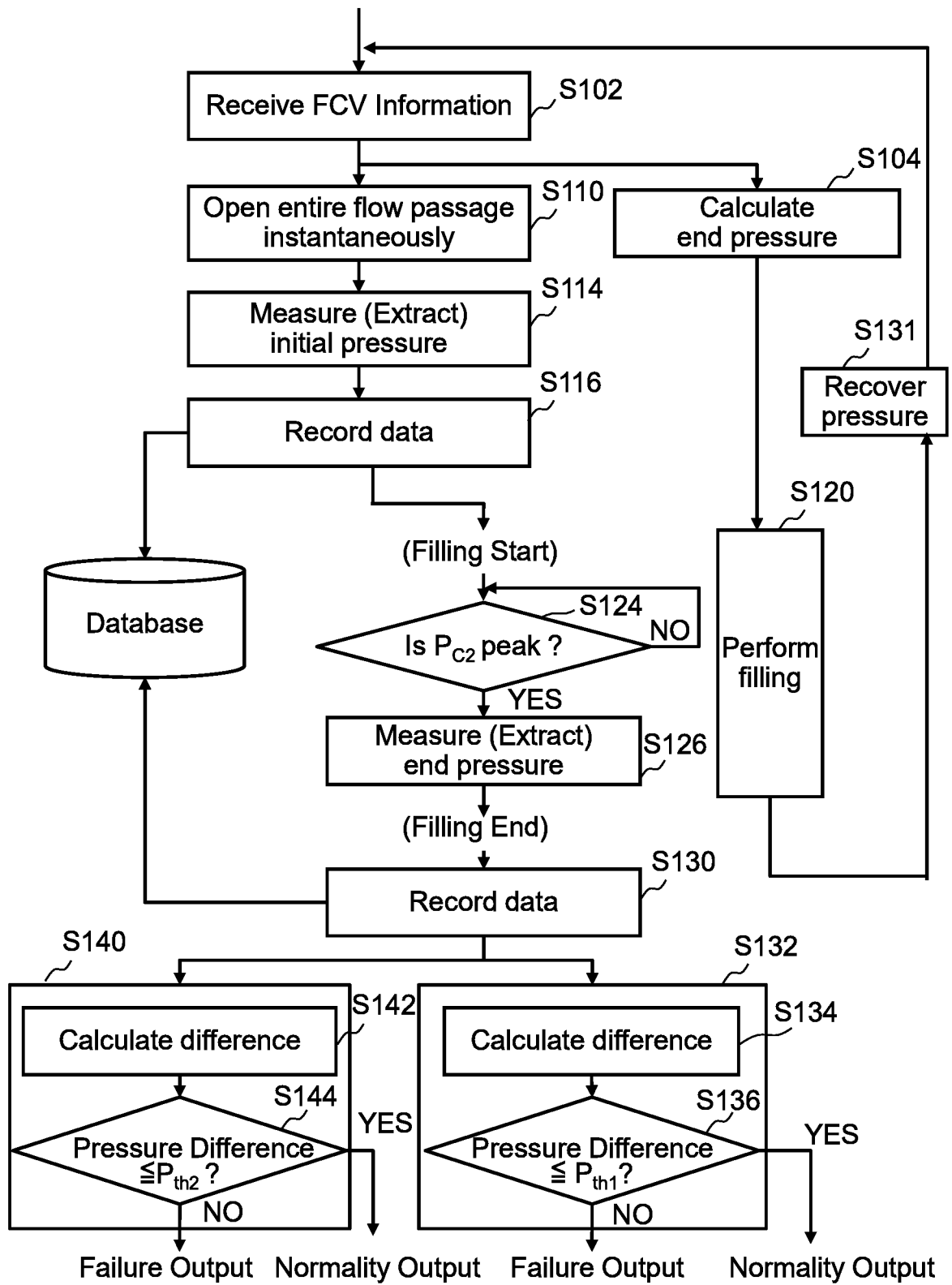
FIG. 7 is a flowchart showing main steps of a hydrogen filling method in a second embodiment.

FIG. 7 is a flowchart showing main steps of a hydrogen filling method in the second embodiment. FIG. 7 is the same as FIG. 3 except that a peak determination step (S124) is performed instead of a flow rate determination step (S122). Contents other than points specifically described below are the same as those in the first embodiment.

The contents of each step from an FCV information reception step (S102) to a filling step (S120) are the same as those in the first embodiment.

As the peak determining step (S124), a determination unit 59 determines whether or not a pressure C2 of a pressure gauge 28 closest to an outlet of the dispenser 30 has reached a highest value during filling of hydrogen fuel. Specifically, the following operation is performed. As a current pressure of a fuel tank 202 approaches a final pressure PF, the pressure C2 indicated by the pressure gauge 28 closest to the outlet of the dispenser 30, which is a pressure gauge closest to the fuel tank 202 on the side of a hydrogen station 102, also increases. Then, at a final stage, a third bank, for example, an accumulator 14 continuously performs filling until the pressure of the fuel tank 202 reaches the final pressure PF. Therefore, at a point of time when the pressure of the fuel tank 202 reaches the final pressure PF, the pressure C2 indicated by the pressure gauge 28 closest to the outlet of the dispenser 30 also reaches the highest value (peak). It can be said that a state at this point of time is the same state as a state where the flow rate F is substantially zero in the first embodiment, as a result. Therefore, the determination unit 59 reads pressure data of the pressure gauge 28 from a storage device 84, and determines whether or not the pressure C2 of the pressure gauge 28 has reached the highest value at a stage before closing the shut-off valves 36 and 38. When the pressure C2 converges at the highest value after a stage where a pressure of the current fuel tank 202 in FCV information is about to reach the final pressure PF, it may be determined whether or not the pressure has reached the highest value. This means that a pressure difference between the accumulator 14 and the fuel tank 202 has been substantially eliminated at this point of time. Therefore, the pressures A3 (A1 or A2), B, C1, C2, and D at this timing should be almost the same values.

Then, as an end pressure measurement (extraction) step (S126), at timing when the pressure C2 of the pressure gauge 28 closest to the outlet of the dispenser 30 reaches the highest value during filling of the hydrogen fuel, a pressure measurement/extraction unit 68 measures pressures measured by a plurality of pressure gauges 15 (11 or 13), 19, 21, and 23 disposed at different positions in a flow passage of the hydrogen fuel between the accumulator 14 and the outlet of the dispenser 30. Specifically, the pressure measurement/ extraction unit 68 extracts, from the storage device 84, the pressures measured by the plurality of pressure gauges 15 (11 or 13), 19, 21, and 23 at the timing when the pressure C2 of the pressure gauge 28 closest to the outlet of the dispenser 30 reaches the highest value during filling of the hydrogen fuel. Further, the pressure measurement/extraction unit 68 extracts the pressure D of the fuel tank 202 of the FCV vehicle 200 at the same timing from the storage device 80.

Then, as a data recording step (S130), the pressure measurement/extraction unit 68 records each of the extracted (input) pressures, which are measured by the plurality of pressure gauges 15 (11 or 13), 19, 21, 23, and 206, in association with the date and time. Specifically, the pressure measurement/extraction unit 68 records each of the pressures A3 (A1 or A2), B, C1, and C2 measured by the plurality of pressure gauges 11 (13 or 15), 19, and 21 at the timing when the pressure C2 of the pressure gauge 28 closest to the outlet of the dispenser 30 reaches the highest value during filling of the hydrogen fuel in the peak determination step (S124), which have been extracted from the storage device 84, in the storage device 86 as recording data of the end pressure in association with the date and time. Further, the pressure measurement/extraction unit 68 records the pressure D of the fuel tank 202 of the FCV vehicle 200 at the timing when the pressure C2 of the pressure gauge 28 closest to the outlet of the dispenser 30 reaches the highest value during filling of the hydrogen fuel in the peak determination step (S124) in the storage device 86 as recording data of the end pressure in association with the date and time. By this method, the same recording data of the end pressure as that in FIG. 6 can be obtained.

The contents of each of a pressure recovery step (S131), an end pressure failure determination step (S132), and an initial pressure failure determination step (S140) are the same as those in the first embodiment. In other words, in the end pressure failure determination step (S132), a control circuit 100 inputs (acquires) each of the pressures measured from the plurality of pressure gauges at the timing when the pressure gauge 28 closest to the outlet of the dispenser 30 indicates the highest value during filling of the hydrogen fuel, determines whether or not a deviation between the pressures is within a threshold value on the basis of acquired pressure values, and outputs a determination result.

As described above, failures of the plurality of pressure gauges disposed in the flow passage from the accumulator 14 to the inside of the dispenser 30 can be diagnosed by using the end pressure obtained by using the normal operation of hydrogen filling. In other words, accuracy of the plurality of pressure gauges can be confirmed. Therefore, it is possible to diagnose failures occurring within a two-year period until a next legal inspection. Further, when the recording data of the end pressure is accumulated on different dates, a transition of measurement accuracy of each pressure gauge can be known. Therefore, it is possible to obtain an index for when the failure occurs during the two-year period. Further, when a degree of the failure does not satisfy required accuracy of the legal inspection, the pressure gauge can be replaced/repaired without waiting for a next legal inspection.

Further, similarly to the first embodiment, failures of the plurality of pressure gauges disposed in the flow passage from the accumulator 10 to the inside of the dispenser 30 can be diagnosed by using the initial pressure obtained by using the normal operation of hydrogen filling. In other words, accuracy of the plurality of pressure gauges can be confirmed. Therefore, it is possible to diagnose failures occurring within a two-year period until a next legal inspection. Further, when the recording data of the initial pressure is accumulated on different dates, a transition of measurement accuracy of each pressure gauge can be known. Therefore, it is possible to obtain an index for when the failure occurs during the two-year period. Further, when a degree of the failure does not satisfy required accuracy of the legal inspection, the pressure gauge can be replaced/repaired without waiting for a next legal inspection.

Here, in the example described above, the case where both the failure diagnosis based on the end pressure and the failure diagnosis based on the initial pressure are performed has been described. However, the present invention is not limited thereto. Similarly to the first embodiment, only one of the failure diagnosis based on the end pressure and the failure diagnosis based on the initial pressure may be performed.

Further, in the failure diagnosis based on the end pressure, data of an accumulator to be a final bank is recorded. Therefore, similarly to the first embodiment, the accumulator to be the final bank in a multi-stage accumulator 101 is operated instead, so that the failure of the pressure gauge of each accumulator can be diagnosed. Conversely, in the failure diagnosis based on the initial pressure, since data of an accumulator to be a 1st bank is recorded. Therefore, similarly to the first embodiment, the accumulator to be the 1st bank in the multi-stage accumulator 101 is operated instead, so that the failure of the pressure gauge of each accumulator can be diagnosed.

As described above, according to the second embodiment, even when a determination method different from that in the first embodiment is used, it is possible to confirm accuracy of the plurality of pressure gauges disposed at least in the flow passage from the accumulator to the inside of the dispenser at low cost by using the normal operation. Therefore, it is possible to diagnose failures occurring within a two-year period until a next legal inspection.

Third Embodiment

Figure 8:
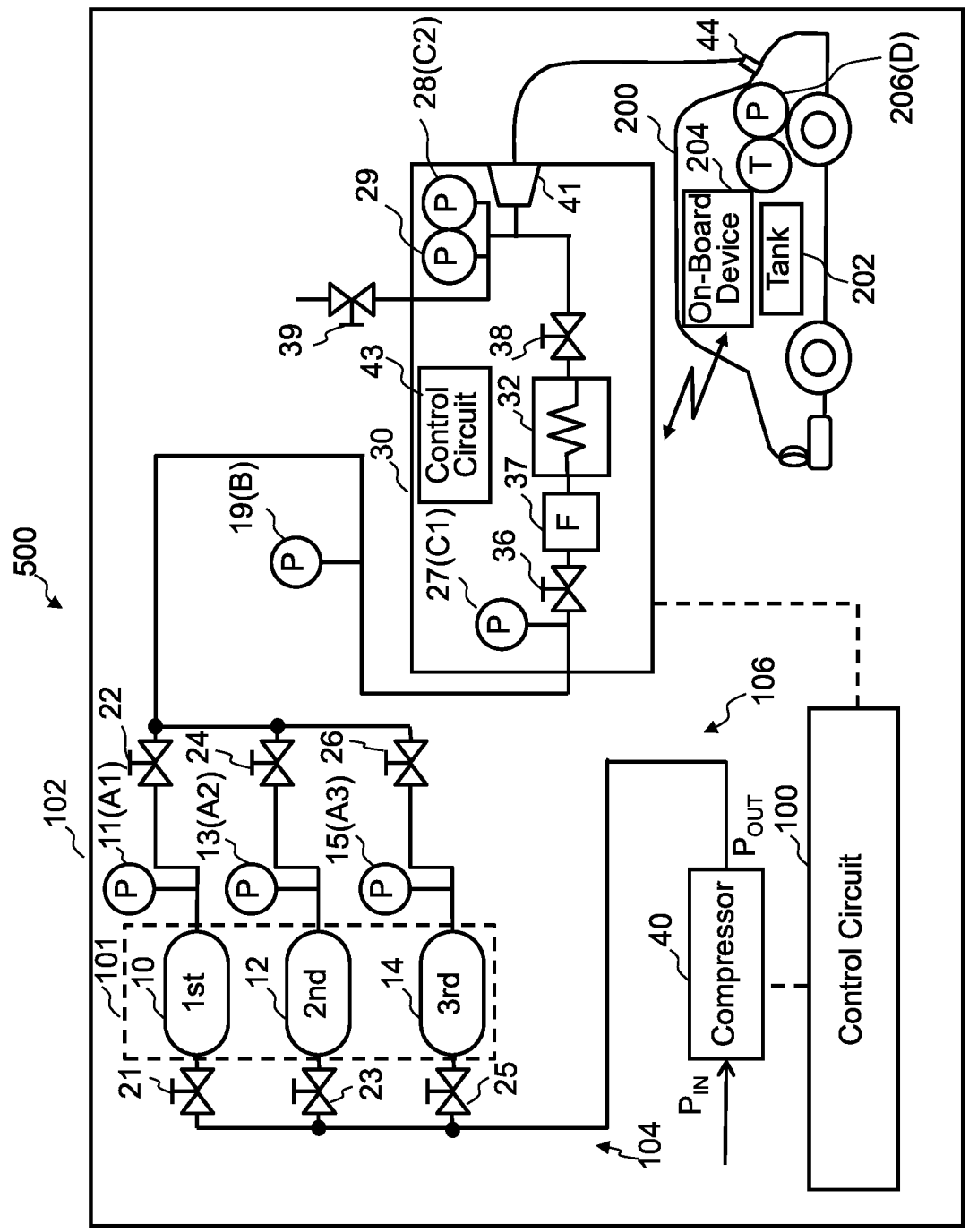
FIG. 8 is an example of a configuration diagram showing a configuration of a hydrogen filling system of a hydrogen station in a third embodiment.

FIG. 8 is an example of a configuration diagram showing a configuration of a hydrogen filling system of a hydrogen station in third embodiment. FIG. 8 is the same as FIG. 1 except that a pressure gauge 29 is disposed in parallel with a pressure gauge 28 for measuring a pressure (C2) near an outlet of a dispenser 30 in the dispenser 30, a depressurization line for branching a pipe connecting a shut-off valve 38 to an emergency detachment coupler 41 is disposed, and a valve 39 is disposed on the depressurization line.

In Embodiment 3, after a filling step (S120) of filling an FCV vehicle 200 with hydrogen fuel via the dispenser 30 from the multi-stage accumulator 101 in which the hydrogen fuel is accumulated ends, the shut-off valve 38 is closed and shut off. When the valve 39 is opened for opening to the atmosphere, it is determined whether or not the pressure gauge 28 (and the pressure gauge 29) (pressure gauge of a depressurization unit) measuring the pressure C2 at timing of opening to the atmosphere indicates 0 MPa (gauge pressure). When the pressure gauge 28 (and the pressure gauge 29) indicates 0 MPa (gauge pressure), it is determined that the corresponding pressure gauge is normal. Conversely, when the pressure gauge 28 (and the pressure gauge 29) does not indicate 0 MPa (gauge pressure), it is determined that the corresponding pressure gauge is abnormal, and automatic calibration or the like is performed. A calibration amount is output to a monitor 76 and displayed on the monitor 76, for example. Alternatively/additionally, the measurement result is output from the output unit 74 to the outside via the communication control circuit 50. In this case, in a control circuit 100, an automatic calibration unit (not shown) corrects (calibrates) a pressure value indicated by the pressure gauge (for example, the pressure gauge 28) determined to be abnormal to 0 MPa (gauge pressure) and records it, so that it is possible to automatically calibrate the pressure gauge (for example, the pressure gauge 28) determined to be abnormal.

Further, in the third embodiment, the pressure (C2) near the outlet of the dispenser 30 is measured by the two pressure gauges 28 and 29. Therefore, when a difference between the two pressures is within an allowable value Pth3, it is determined that the pressure gauge is normal. Conversely, when the difference is not within the allowable value Pth3, it is determined that one of the pressure gauges 28 and 29 is out of order. In that case, as compared with a pressure D of the fuel tank 202 of the FCV vehicle 200 at timing of an end pressure measurement in each of the above-described embodiments, it can be determined that the pressure gauge having one of the pressures indicated by the two pressure gauges 28 and 29, which has a larger pressure difference from the pressure D of the fuel tank 202, is out of order. In this case, in the control circuit 100, with the automatic calibration unit (not shown), a pressure value indicated by the pressure gauge (for example, the pressure gauge 28) determined to be out of order is corrected (calibrated) to a pressure value indicated by the normal pressure gauge (for example, the pressure gauge 29) and recorded, so that it is possible to automatically calibrate the pressure gauge (for example, the pressure gauge 28) to be out of order.

A method for calibrating the pressure gauge of the hydrogen filling system in the third embodiment includes steps of a failure diagnosis method for the pressure gauge of the hydrogen filling system in each of the above-described embodiments. Preferably, a plurality of pressure gauges include two pressure gauges disposed in parallel near the outlet of the dispenser 30, and the method further includes a step of, as a determination result, automatically calibrating a pressure gauge diagnosed as a failure among the plurality of pressure gauges, on the basis of one of the two pressure gauges. Specifically, the following operation is performed. Since it is usually unlikely that the two pressure gauges 28 and 29 fail at the same time, the failure diagnosis in each of the above-described embodiments is performed. For a pressure gauge determined to be out of order among a plurality of pressure gauges disposed at different positions in a flow passage of the hydrogen fuel between the multi-stage accumulator 101 and the outlet of the dispenser 30, a measured pressure value is corrected (calibrated) and recorded by the automatic calibration unit (not shown), on the basis of one of the two pressure gauges 28 and 29, so that the pressure gauge to be out of order is automatically calibrated. When it is determined that one of the two pressure gauges 28 and 29 is out of order, it goes without saying that the other determined to be normal is used as a reference.

For the automatic calibration, preferably, pressures are compared with pressure D of fuel tanks 202 in a plurality of different FCV vehicles 200, and the automatic calibration is performed when a pressure difference from the pressures D of the fuel tanks 202 in all the FCV vehicles 200 is larger than a threshold value. Since it is usually unlikely that the pressure gauges in the fuel tanks 202 of all the FCV vehicles 200 fail, the accuracy of determining the presence/absence of a failure can be improved by comparing the pressure gauge with the pressure gauges of the plurality of FCV vehicles 200 that arrive at random.

The embodiments have been described with reference to the specific examples. However, the present invention is not limited to these specific examples. For example, in the above-described examples, the case where the multi-stage accumulator 101 including the three accumulators 10, 12, and 14 is used to fill one FCV vehicle with the hydrogen fuel has been described. However, the present invention is not limited thereto. According to the volumes of the accumulators 10, 12, and 14 and the like, more accumulators may be used to fill one FCV vehicle with the hydrogen fuel. Alternatively, two accumulators may be used to fill one FCV vehicle with the hydrogen fuel.

Further, descriptions of parts and the like that are not directly necessary for explanation of the present invention, such as the device configuration and the control method, are omitted. However, the necessary device configuration and control method can be appropriately selected and used.

Further, all failure diagnosis methods for a pressure gauge of a hydrogen filling system including the elements of the present invention and capable of being appropriately designed and changed by those skilled in the art are included in the scope of the present invention.

What is claimed is:

1. A method for diagnosing failure in a pressure gauge of a hydrogen filling system, comprising:
   providing a hydrogen filling system that includes:
      an accumulator in which hydrogen fuel is accumulated;
      a dispenser configured to fill a fuel cell vehicle powered by hydrogen fuel with the hydrogen fuel from the accumulator;
      a plurality of pressure gauges disposed at different positions in a flow passage of the hydrogen fuel between the accumulator and the outlet of the dispenser; and
      a control circuit configured to control the hydrogen filling system, wherein the method further includes:
   acquiring, with the control circuit, pressure values measured by the plurality of pressure gauges at a time that a pressure gauge closest to an outlet of the dispenser in the plurality of pressure gauges indicates a highest value during the filling of the hydrogen fuel,
   determining, with the control circuit, whether or not a deviation between the pressure values is within a threshold pressure value on the basis of acquired pressure values from only the plurality of pressure gauges disposed between the accumulator and the outlet of the dispenser, and
   outputting, with the control circuit, a determination result;

accumulating the hydrogen fuel in a multi-stage accumulator including the accumulator; and providing the plurality of pressure gauges at least at a position adjacent to each accumulator of the multi-stage accumulator, near an inlet in the dispenser, and near an outlet in the dispenser.

2. The method according to claim 1, wherein the dispenser sequentially fills a plurality of fuel cell vehicles powered by hydrogen fuel with the hydrogen fuel on different dates from the accumulator, and wherein the control circuit is further configured to:

acquire pressure values measured by pressure gauges disposed at different positions in a flow passage of the hydrogen fuel between the accumulator and just before a shut-off valve of the dispenser in the plurality of pressure gauges at a time that the shut-off valve of the dispenser is closed after a flow passage of the hydrogen fuel between the accumulator and the fuel cell vehicle filled with the hydrogen fuel is temporarily opened before starting the filling of the hydrogen fuel, for each time each of the plurality of fuel cell vehicles is filled with the hydrogen fuel, and record the pressure values in association with dates, and determine whether or not a pressure change in transition of each pressure value recorded on a different date is within a threshold value, for each of the plurality of pressure gauges, and output a determination result.

3. The method according to claim 1, wherein the filling of the hydrogen fuel is performed for a plurality of fuel cell vehicles on different dates, and the control circuit is further configured to:

acquire pressure values measured by pressure gauges disposed at different positions in a flow passage of the hydrogen fuel between the accumulator and just before a shut-off valve of the dispenser in the plurality of pressure gauges at a time that the shut-off valve of the dispenser is closed after a flow passage of the hydrogen fuel between the accumulator and the fuel cell vehicle filled with the hydrogen fuel is temporarily opened before starting the filling of the hydrogen fuel, for each time each of the plurality of fuel cell vehicles is filled with the hydrogen fuel, and record the pressure values in association with dates, and determine whether or not a pressure change in transition of each pressure value recorded on a different date is within a threshold value, for each of the plurality of pressure gauges, and output a determination result.

4. The method according to claim 1, wherein the plurality of pressure gauges include two pressure gauges disposed in parallel near the outlet of the dispenser; and the control circuit is further configured to automatically calibrate a pressure gauge diagnosed as a failure in the plurality of pressure gauges as the determination result, on the basis of one of the two pressure gauges.

5. The method according to claim 1, wherein the control circuit is further configured to:

determine whether or not a pressure gauge in a depressurization portion of the dispenser in the plurality of pressure gauges indicates a zero gauge pressure at a time that a shut-off valve of the dispenser is closed and shut off after the filling ends and a flow passage on a side of an outlet of the dispenser is opened to an atmosphere; and automatically calibrate the pressure gauge in the depressurization portion of the dispenser, in a state where the pressure gauge does not indicate the zero gauge pressure.

6. The method according to claim 1, wherein the control circuit is further configured to:

acquire pressure values measured by the plurality of pressure gauges at a time that a flow rate of the hydrogen fuel to be filled at a stage close to an end of the filling becomes a threshold value or less, determine whether or not a deviation between the pressure values is within a threshold value on the basis of acquired pressure values, and output a determination result.

* * * * *